3,168,505
PROCESS FOR WORKING UP POLYOLEFINS
Herbert Kreuter, Eschborn, Taunus, Claus Heuck, Hofheim, Taunus, Siegfried Sommer, Frankfurt am Main, and Siegfried Wagener, Sulzbach, Taunus, Germany, assignors, by mesne assignments, to Hercules Powder Company Incorporated, Wilmington, Del., a corporation of Delaware
No Drawing. Filed Mar. 15, 1960, Ser. No. 15,048
Claims priority, application Germany, Mar. 25, 1959, F 28,030
6 Claims. (Cl. 260—93.7)

The present invention relates to a process for working up polyolefins.

It is known that olefins, such as ethylene, propylene or butylene, can be polymerized in the presence of an inert solvent, preferably a saturated hydrocarbon, and with the use of an organometal compound and a heavy metal salt, so as to obtain polyolefins that can be used as plastic materials. Such low pressure polymerization can be carried out with special advantage using a catalyst mixture consisting substantially of a titanium chloride and an organo-aluminum compound which, if desired, may contain chlorine. These low-pressure polymerization processes are defined in the art as being Ziegler-type processes and have been described by Raff-Allison in "Polyethylene," pages 72–81.

Following the polymerization, the polymer which is suspended in the hydrocarbon used, has to be freed fairly quantitatively from the polymerization catalyst and the organic dispersant. It is especially important to remove the chlorine-containing catalyst constituents or to make them inactive by hydrolyzing them with an alkali. If following the manufacturing process, a polyolefin still contains reactive chlorine, this will result in hydrogen chloride being split off during the treatment of the polymer on the processing machines at the high-working temperatures usually used. Strong corrosion phenomena are liable to occur at the metal surfaces of the shaping machines so that colored and contaminated shaped articles are obtained.

It has therefore been proposed that low-pressure polyolefins be freed from the polymerization catalyst by first treating the polymer suspension with a hydrocarbon-soluble alcohol, then separating the major proportion of the dispersant by mechanical means over a filter and expelling with steam the dispersant residues still adhering to or included in the polymer. During said steam treatment the polyolefin is freed from the dispersant and partially from residual catalyst constituents. It is especially advantageous to carry out the steam-treatment in the presence of an alkaline substance, such as sodium or potassium hydroxide or—following the steam treatment —to aftertreat with an alkali the polyolefin which is suspended in the aqueous phase, whereby titanium-chlorine or aluminum-chlorine linkages are partially decomposed hydrolytically. Small amounts of alkalies are retained in or on the polymer which act as acid stabilizers during the polyolefin processing and avoid undesired corrosion.

It was found that the alkalies adhering to the polymer substantially account for corrosion phenomena being avoided. Thus, for example, a low-pressure polyolefin treated with steam in the presence of sodium hydroxide and exhaustedly washed with desalted water will again involve corrosion during the processing.

This result indicates that under the conditions of steam distillation, i.e. at a temperature of about 100° C., the residual chlorine-containing catalyst constituents are not completely hydrolyzed by sodium hydroxide solution. Only at the high processing temperatures of more than 200° C. is chlorine split off in the form of hydrogen chloride which is neutralized by the alkali present and thus rendered inactive. Although small amounts of sodium hydroxide in the polymer work out favorably during the processing as regards the suppression of corrosion phenomena, they are very disadvantageous in colored polymers or stabilized polymers. It is known that polyolefins have to be stabilized to withstand oxidation and the action of ultraviolet rays. The commercial active stabilizers generally constitute compounds which contain phenolic groups or are of the amine-type or contain sulfur; practically all these stabilizers undergo reaction at the high working temperatures with the very reactive alkali metal hydroxides. This reaction leads to products which have the character of dyestuffs and color or yellow the colorless polyolefin.

On the other hand, the colorless polyolefin powder is already colored before it is being granulated in order to produce colored shaped articles. In this case, too, the alkali hydroxide may react with the dyestuff during the subsequent processing of the colored powder on the extruder or injection molding machine and produce undesired discolorations.

We have now found that polyolefins which have been obtained by polymerizing lower olefins containing from 2–12 carbon atoms in a hydrocarbon as the dispersant and with the use of a Ziegler low pressure catalyst system can be purified by steam distillation, wherein the said polyolefins following the polymerization are treated in an aqueous phase with an alkali metal salt of a weak to moderately strong acid, the alkali metal salt being used in an amount of 0.05–0.5% calculated on the polyolefin, and the said salt having a pH of 7–8, advantageously 7.1–7.5 in a 0.05–1.0% aqueous solution. The treatment with the above salts may be carried out before, during or after the said steam distillation.

As salts which may successfully be used, there may be mentioned more especially: sodium or potassium acetate, sodium pyrophosphate, disodium hydrogen phosphate, sodium polyphosphates, alkali metal propionates, alkali metal carbonates and alkali metal borates. The term alkali metal is here intended to mean advantageously sodium and potassium. There may also be used mixtures of the aforesaid salts having the nature of a buffering mixture. In carrying out the process of this invention the hydrocarbon-containing polyolefin which has preferably been suspended with the aid of a wetting agent or emulsifier is advantageously mixed with about 0.05–0.5% alkali metal salt, calculated on the polyolefin, and then subjected to steam distillation. Alternatively, the alkali metal salt may be added following the steam distillation and the suspension is then stirred for some time at a raised temperature. It is, however, advantageous following the steam treatment to remove the major amount of the aqueous phase over a filter, then to suspend the water-moist polyolefin with water to which 0.05 to 0.5% alkali metal salt has been added, and to stir the suspension for some time at a temperature of 40–95° C. The polyolefin is then separated from the aqueous phase and dried.

Working up low-pressure polyolefins based, for example, on ethylene, propylene, butene or mixtures thereof, in the manner described above results in the formation of products which are absolutely colorless even in the stabilized state. The polymers so treated can be extruded or injection molded without corrosion phenomena occurring even during very long processing periods. In colored shaped articles, discolorations are not liable to occur as the salts added exhibit only a slight alkalinity so that they cannot react with the dyestuff used.

The following examples serve to illustrate the invention, but they are not intended to limit it thereto:

*Example 1*

Ethylene was polymerized in 1000 cc. of a saturated petroleum faction boiling between 150° and 180° in the presence of 10 millimols titanium tetrachloride and 20 millimols diethylaluminum monochloride to obtain 250 grams polyethylene in the course of 4 hours. After the polymerization had been terminated, the suspension obtained was mixed with 50 cc. isopropanol and stirred for 2 hours at 75° C. The major quantity of the dispersant was removed over a filter. The resulting hydrocarbon-containing polyethylene was suspended in 1000 cc. desalted water in which 1 gram disodium hydrogen phosphate had previously been dissolved, with the addition of 0.5 gram of an alkylsulfonate containing from 12–14 carbon atoms as the emulsifier. Steam was then introduced until the dispersant ceased to distil over. Following the steam treatment, the pH value of the aqueous suspension was adjusted to 7.3 by adding some cc. of a 10% aqueous solution of disodium hydrogen phosphate, the suspension was filtered and the water-moist polyethylene was dried at 80° C. in a vacuum drying cabinet.

In a comparative example the steam treatment was carried out in the same manner as described above with the exception that sodium hydroxide was used at the same pH in the place of disodium hydrogen phosphate.

In a test small bright steel plates were pressed into the polyethylene at 180° C. It was found that both the product treated with sodium hydroxide and that treated with disodium hydrogen phosphate did not involve corrosion phenomena taking place on the metal surface. The two polyethylene powders were mixed with 0.03% of a green dyestuff based on phthalocyanine and then injection molded at 280° C. to obtain sheets. The sheet prepared from the product treated with $Na_2HPO_4$ exhibited the pure green tint of the dyestuff while the sheet prepared from the product treated with sodium hydroxide was dirty grey.

*Example 2*

Propylene was polymerized in 100 liters methylcyclohexane with the use of 1 mol titanium trichloride and 3 mol of diethylaluminum monochloride to obtain about 30 kg. isotactic polypropylene. After the polymerization had been terminated, the suspension was stirred for 1 hour at 80° C. while 2 liters n-butanol were added and the whole was extracted three times each time with 50 liters desalted water.

The major quantity of the dispersant was suction-filtered, the hydrocarbon-containing polypropylene was suspended in 100 liters water with the aid of a wetting agent and steam was introduced until all the methylcyclohexane had distilled off. Following the steam treatment, the aqueous phase was removed by filtration.

The water-moist polypropylene was subdivided into three equal portions and each portion was suspended with 30 liters desalted water. The three suspensions obtained were adjusted to a pH-value of 7.4 by adding (*a*) sodium hydroxide, (*b*) sodium pyrophosphate, and (*c*) sodium acetate and stirred for two hours at 90° C. The suspensions were then filtered and dried.

The three polypropylenes so treated were mixed each with 0.25% of an oxidation stabilizer, for example 4.4'-thio-bis-(6-tert. butyl-m-cresol) and then granulated on an extruder at 230° C. The granular polypropylenes so obtained were distinctly different from one another as regards coloration.

The granular polypropylene treated with NaOH exhibited a yellow brown coloration whilst the products which had been treated with sodium pyrophosphate and sodium acetate, respectively, were completely colorless. These differences in coloration were even more pronounced in shaped articles made from these granulates by injection molding.

We claim:

1. In a process for purifying polyolefins obtained by the polymerization of an olefin of 2–12 carbon atoms in a hydrocarbon dispersant employing as the catalyst a compound of a metal of Groups IVB–VIB of the Periodic Table and an organic compound of a metal selected from the group consisting of alkali metals, alkaline earth metals, zinc, and earth metals, the improvement comprising (1) adding to the polymerization reaction mixture containing the polyolefin an aliphatic alcohol selected from the group consisting of isopropanol and butanol, (2) removing the major quantity of the dispersant by filtration, (3) suspending the separated polymer in desalted water containing 0.05–1 weight percent of an inorganic alkali metal phosphate, selected from the group consisting of sodium pyrophosphate and disodium hydrogen phosphate, (4) introducing steam into the resulting aqueous polymer suspension until the dispersant ceases to distill over and (5) separating polymer from the resulting slurry, thereby recovering a polymer containing a small amount of alkali metal phosphate adhering to the surface thereof.

2. The process of claim 1 wherein the desalted water containing 0.05–1% of said alkali metal phosphate has a pH value of 7 to 8.

3. The process of claim 1 wherein the desalted water containing 0.05–1% of said alkali phosphate has a pH value of 7.1–7.5.

4. An improved process for recovering in a form free of discoloration a polyethylene which has been prepared by the polymerization of ethylene in a hydrocarbon dispersant employing as the catalyst titanium tetrachloride and an alkylaluminum chloride, which process comprises adding isopropanol to the polyethylene dispersion with thorough mixing, removing the major quantity of the dispersant by filtration, suspending the separated polyethylene in desalted water containing 0.05–1 weight percent of disodium hydrogen phosphate, steam-distilling the suspension to remove the dispersant, adding sufficient disodium hydrogen phosphate to the residual aqueous suspension to attain a substantially neutral pH value, and then filtering the suspension and drying the moist polyethylene thereby recovering polyethylene having a small amount of disodium hydrogen phosphate adhering to the surface thereof.

5. An improved process for recovering in a form free of discoloration a polypropylene which has been prepared by the polymerization of propylene in a hydrocarbon dispersant employing as the catalyst titanium trichloride and a dialkylaluminum chloride, which process comprises adding butanol to the polypropylene suspension, followed by stirring, extracting the suspension with desalted water, separating the major portion of the dispersant, suspending the hydrocarbon-containing polypropylene in water and then steam-distilling the hydrocarbon therefrom, separating the aqueous phase, suspending the moist polypropylene in desalted water containing 0.05–1 weight percent of sodium pyrophosphate, and then filtering the suspension and drying the polypropylene residue thereby recovering polypropylene having a small amount of sodium pyrophosphate adhering to the surface thereof.

6. In a process for the recovering of polyolefins obtained by the polymerization of an olefin of 2–12 carbon atoms in a hydrocarbon dispersant employing as the catalyst a compound of a metal of Groups IVB–VIB of the Periodic Table and an organic compound of a metal selected from the group consisting of alkali metals, alkaline earth metals, zinc, and earth metals, followed by mixing an aliphatic alcohol selected from the group consisting of isopropanol and butanol with the polyolefin suspension, separating the major portion of the hydrocarbon dispersant and suspending the remaining hydrocarbon-containing polyolefin in water, followed by steam distillation to remove the hydrocarbon, the improved method of obtaining the polyolefin in a form which is free of discoloration which comprises suspending the wet polyolefin subsequent to said steam distillation step in desalted water containing 0.05–1 weight percent of an inorganic alkali metal phosphate, stirring the suspension, and then filtering the suspension and drying the moist polyolefin thereby recovering a polyolefin having a small amount of said inorganic alkali metal phosphate adhering to the surface thereof.

References Cited by the Examiner

UNITED STATES PATENTS

| 2,838,477 | 6/58 | Roelen et al. | 260—94.9 |
| 2,868,765 | 1/59 | Haefner et al. | 260—45.7 |
| 2,952,658 | 9/60 | Pfeifer et al. | 260—45.7 |
| 2,985,617 | 5/61 | Salyer et al. | 260—45.7 |
| 2,988,543 | 6/61 | Meyer et al. | 260—94.9 |
| 3,036,055 | 5/62 | Greenwell | 260—94.95 |

FOREIGN PATENTS

| 220,370 | 2/59 | Australia. |
| 1,159,840 | 2/58 | France. |

JOSEPH L. SCHOFER, *Primary Examiner.*

L. H. GASTON, J. R. LIBERMAN, *Examiners.*